United States Patent [19]
Seitz

[11] 4,091,686
[45] May 30, 1978

[54] DRIVE MECHANISM FOR THE SPINDLE OF A TOOL MACHINE

[75] Inventor: Max Seitz, Munich, Germany

[73] Assignee: Carl Hurth Maschinen- und Zahnradfabrik, Munich, Germany

[21] Appl. No.: 762,750

[22] Filed: Jan. 26, 1977

[30] Foreign Application Priority Data

Jan. 28, 1976 Germany ............................ 2603091

[51] Int. Cl.² ...................... F16H 55/18; F16H 1/02; F16H 1/16
[52] U.S. Cl. ............................... 74/409; 74/412 TA; 74/425
[58] Field of Search ................ 74/412 TA, 425, 409

[56] References Cited

U.S. PATENT DOCUMENTS 1,829,249  10/1931  Beulwitz ................. 74/412 TA X
2,781,616  2/1957   Estabrook ............... 74/412 TA X

FOREIGN PATENT DOCUMENTS 446,745  6/1927  Germany ................. 74/425
478,968  6/1929  Germany ................. 74/425

*Primary Examiner*—Leonard H. Gerin
*Attorney, Agent, or Firm*—Blanchard, Flynn, Thiel, Boutell & Tanis

[57] ABSTRACT

A drive mechanism for a spindle of a tool machine, in particular a tool machine having a hob rotatably mounted thereon. Worm gearing is provided for driving the workpiece relative to the hob. Clearance is normally provided between the teeth on the worm and the teeth on the worm gear. Structure is provided for eliminating the clearance so that the drive of the workpiece is a positive drive and no errors exist due to the clearance normally provided between the teeth on the gear and the worm gear. In the particular embodiment disclosed in this application, a second worm is provided and is driven by the first-mentioned worm and worm gearing. The helix angle on the second worm lies outside of the automatic locking area and, in turn, acts onto a braking mechanism.

7 Claims, 3 Drawing Figures

DRIVE MECHANISM FOR THE SPINDLE OF A TOOL MACHINE

FIELD OF THE INVENTION

The invention relates to a drive mechanism for the spindle of a tool machine, in particular for the workpiece spindle of a hobbing machine, through a worm gearing or the like with play compensation with the aid of a second worm.

BACKGROUND OF THE INVENTION

It is known to drive the workpiece spindle of tool machines through a worm for the purpose of overcoming play (backlash), the pitch of which worm changes from the one end to the other end. The amount of play is determined by axially moving this worm and by axially securing same if freedom of play is found. These worms are very expensive and a complete freedom of play cannot be achieved, because heat expansion, pitch errors and other influences must be considered.

It is also known to drive the spindle through two worms, which are moved against one another for a freedom of play so that each one worm engages both flanks of the worm gear. A residual amount of play remains either in existence or the drive jams up for reasons of heat expansion, pitch inexactnesses and other influences.

Finally it is also known to drive playfree with two worms, of which one worm can give way axially against a force. This device is little effective. Furthermore, the two last-mentioned arrangements are expensive.

The basic purpose of the invention is an as inexpensive as possible drive mechanism, in which the freedom or lack of play is assured better than in the known devices. Furthermore, a damping of the rotary oscillations is supposed to be achieved.

The basic purpose of the invention is attained by a drive mechanism, which has the characteristics of the first patent claim. The term brake includes in the sense of the invention also all rotary oscillation dampers and cancellers and driven plates.

The effect of the invention is based namely on the high speed translation at the slack absorbing worm. If this translation would be small, then the rotation based on nonuniformity, which is to be avoided would not arrive at the brake, because of the elasticity of the system. However, due to the high speed translation, at a very small angle of rotation at the spindle there results a very large angle at the brake. The limit of the translation is the automatic locking wherein one must start out from the static friction condition. Due to the fact that the towing worm lies very closely beside but outside the automatic locking area, also already through this a rebound is avoided.

Further advantages and characteristics of the invention result from the following description.

BRIEF DESCRIPTION OF THE DRAWINGS

The invention is discussed in connection with one exemplary embodiment which is described in connection with FIGS. 1 to 3.

In the drawings.

DETAILED DESCRIPTION

Figure 1:
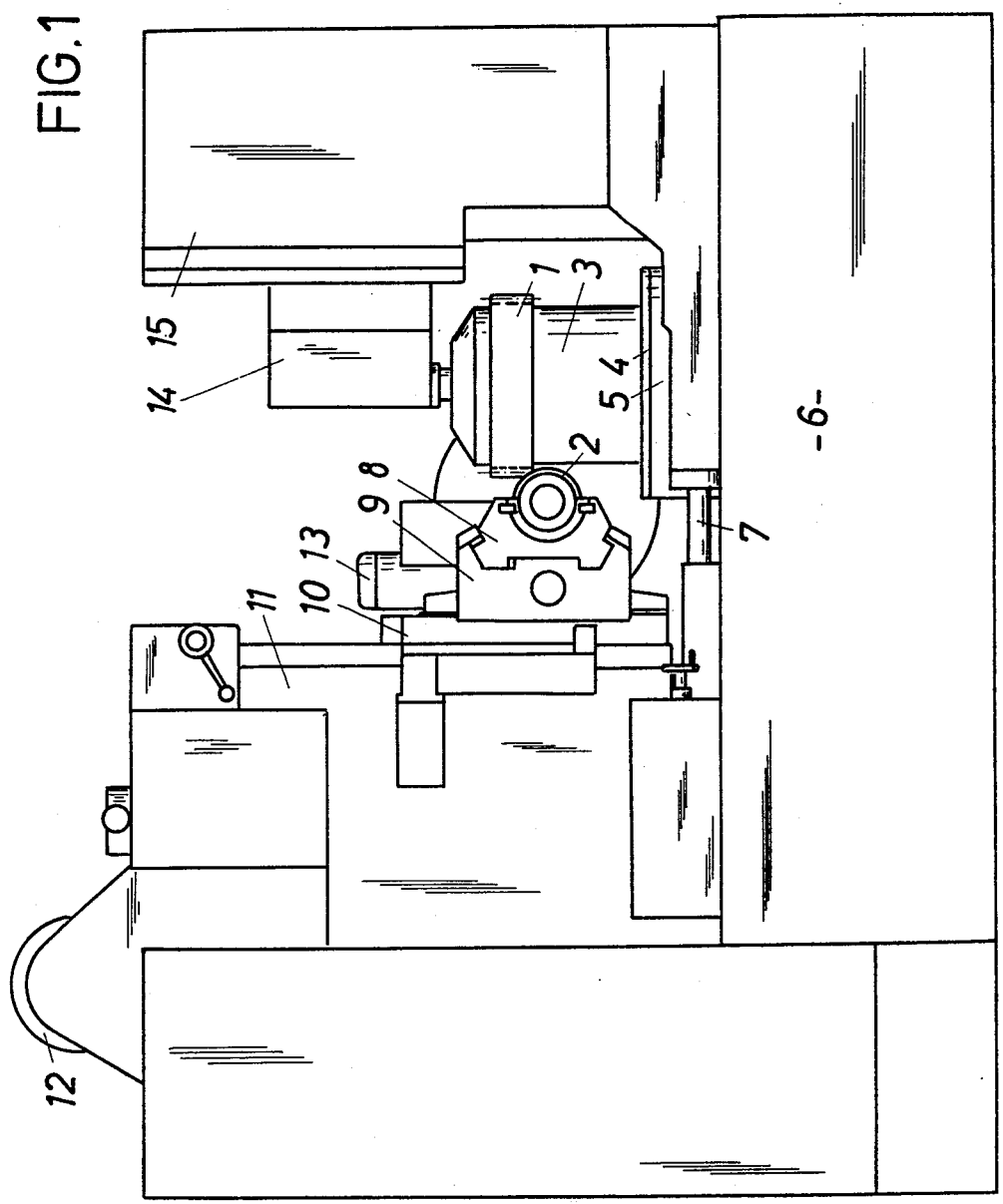
FIG. 1 illustrates a gear hobbing machine, on which the invention can be applied.

FIG. 1 illustrates a gear hobbing machine, on which the invention is applied. The workpiece 1, a spur gear, which is worked with a hob 2, is chucked with the aid of a chucking device 3 on the face plate 4 of a workpiece spindle 5. The workpiece spindle 5 is supported rotatably in the machine frame 6 and it is driven by a not-illustrated motor through an also not-illustrated gearing and through a transmission shaft 7 and thence through a worm gear which will be described more in detail below.

The hob 2 is rotatably supported in a laterally shiftable carriage 8. An associated carriage guide 9 is pivotally supported on a longitudinal carriage 10, namely in such a manner that the hob 2 can be adjusted to its tooth pitch and to the helix angle of the workpiece teeth. With the aid of the longitudinal carriage 10, it is possible to move the hob 2 parallel with respect to the axis of the workpiece spindle (in machines with differential gearing) or parallel with respect to the workpiece teeth (in machines, which work according to the so-called Grant method). The guideway for the longitudinal carriage 10 is supported on a down-feed carriage 11 which can be moved perpendicularly with respect to the axis of the workpiece spindle on the machine frame 6. The diameter and the tooth depth of the workpiece can be selected and adjusted with the down-feed carriage 11. Down-feed, longitudinal feed, rotation of the hob and rotation of the workpiece are driven from a drive motor 12 through a gearing which is principally known. To shift the hob, a further electromoter, a so-called shift motor 13, is provided which acts onto the shift carriage through a not-illustrated gearing and an also not-illustrated screw spindle.

The workpiece 1 or its chucking device or a mandrel can be supported by means of a tailstock 14. The tailstock 14 is longitudinally movable, therefore supported drivably and clampably on an overhanging block 15, which is screwed onto the machine frame or forms one unit with same. To clamp or chuck the workpiece on the face plate 4 or the workpiece spindle 5, a drivable chucking device is provided.

Figure 2:
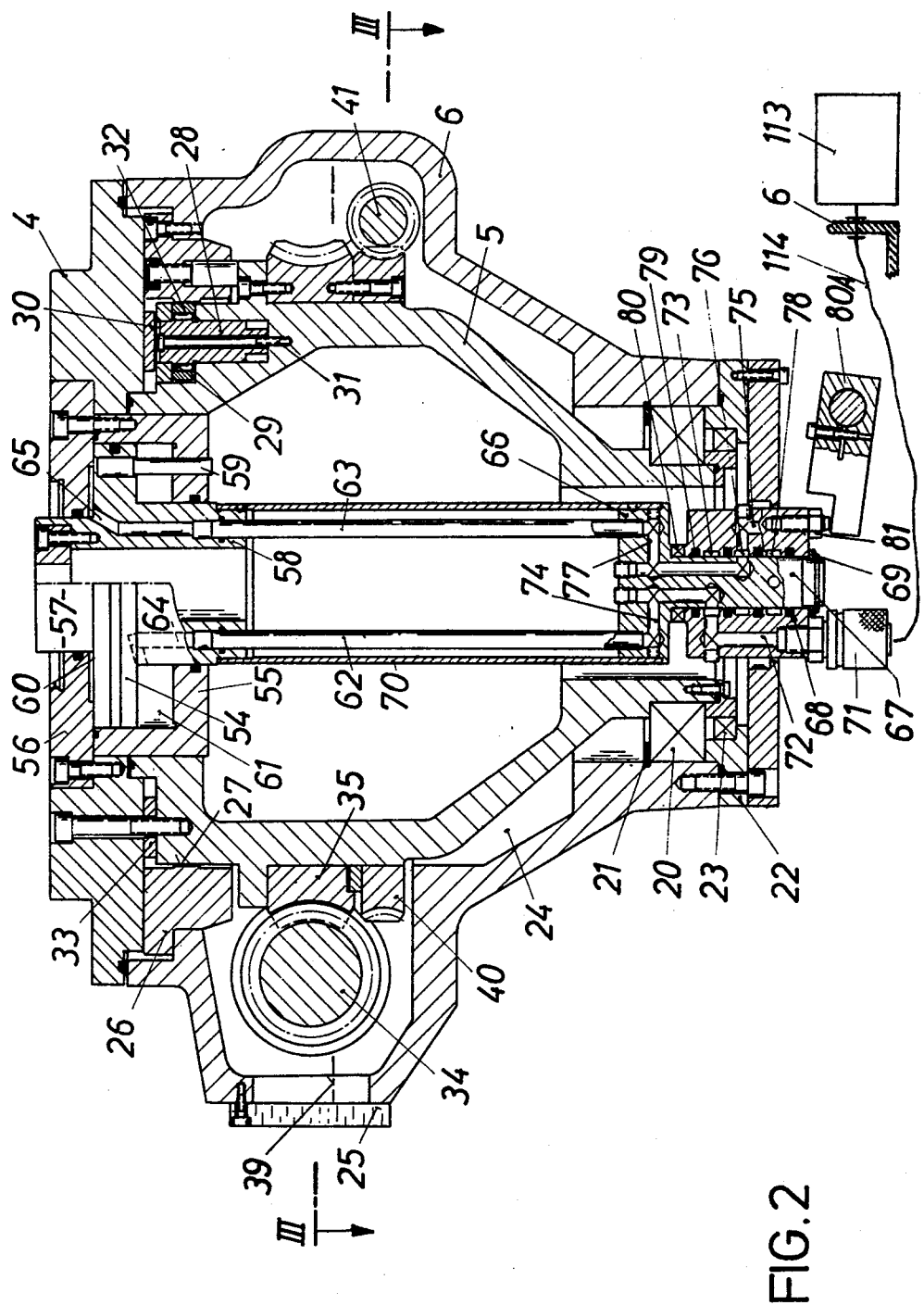
FIG. 2 is a cross-sectional view of a tool spindle with a drive mechanism according to the invention.
Figure 3:
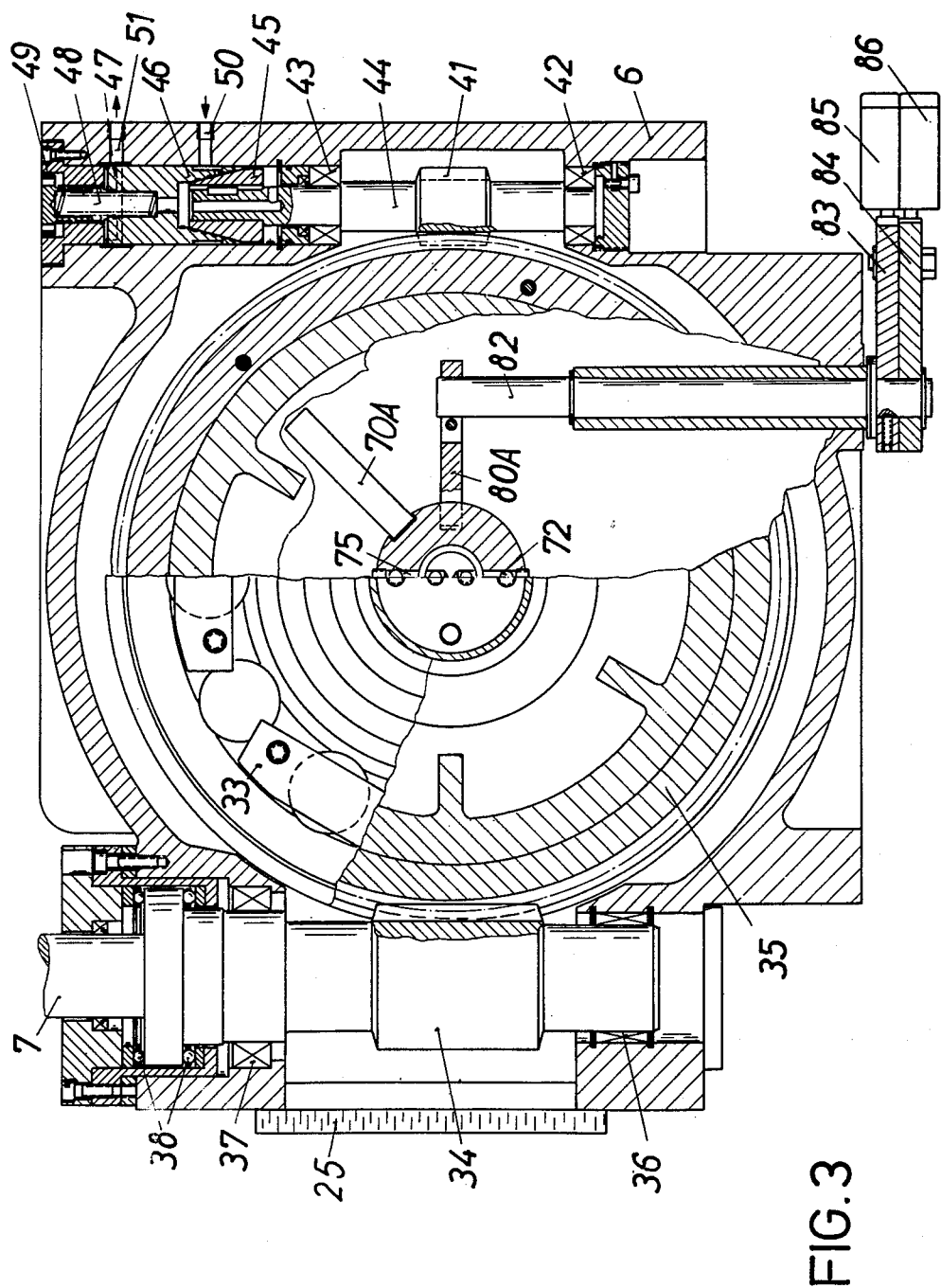
FIG. 3 illustrates a cross-sectional view taken along the line III—III of FIG. 2 and partially a cross-sectional view of the pressure medium supply line to the chucking device.

FIGS. 2 and 3 illustrate cross-sectional views of a workpiece spindle 5. Reference numeral 6 identifies a machine frame or a part connected to it and in which the workpiece spindle 5 is supported. The upper end of the workpiece spindle 5 is provided with the face plate 4. To support the workpiece spindle 5, a roller bearing 20 is provided at its lower end, which roller bearing is held axially between a spring ring 21 and a flange 22 secured to the lower end of the frame 6 by a plurality of screws. A shaft packing 23 is provided between the flange 22 and the workpiece spindle 5 or a part which can be secured to said workpiece spindle so that between the machine frame 6 and the workpiece spindle 5 there is provided a downwardly closed space 24 in which can accumulate the oil or the like needed for lubricating the spindle bearing. The oil level in this space can be observed through a sight glass 25.

To support the upper end of the workpiece spindle 5, a bearing ring 26 is provided in the machine frame and has on the inside surface thereof a bearing surface 27. A plurality of pins 28, the axis of which is parallel with the axis of the workpiece spindle, is secured to the workpiece spindle. The pins 28 form within the aforementioned bearing surface a ring. The pins have a cylindrical bearing surface 29. The bearing surfaces 29 are arranged to a small degree eccentrically with respect to the axis of the pins 28. The pins 28 have at the upper end thereof a slot 30 so that the pins can be rotated with the aid of a screw driver or the like. Thus it is possible to adjust the distance of the axis of the bearing surfaces 29 from the bearing surface 27. Subsequently the pins 28 are locked into place with screws 31 extending coaxially with the axis of the pins 28 and the bearing surface 29. Rollers 32, preferably needle bearings, are rotatably supported on the bearing surfaces 29. The outer surfaces of the rollers or needle bearings are constructed preferably slightly spherical to prevent the rollers from carrying with their edges and thus possibly becoming overloaded. With the aid of the eccentric bearing surfaces 29, the rollers can be adjusted so that they rest without clearance on the bearing surface 27.

The bearing ring 26 is axially supported on the face plate 4. The means for lubrications are known and are therefore not described.

It is important for the perfect drive of the workpiece spindle 5 that the hereinbelow-described drive worm runs exactly centrally to the worm gear. In order to be able to adjust or fit this centricity, a plurality of spacing plates 33 are inserted and secured between face plate 4 and workpiece spindle 5. These spacing plates are machined to a thickness which assures the said centricity. The spacing plates have the advantage of making it simpler to machine same to a desired thickness than, for example, the planar surface of the bearing ring 26.

The workpiece spindle 5 is driven through the said transmission shaft 7 by a drive worm 34, which mates with a driven worm gear 35 secured to the workpiece spindle 5. To support the worm 34, roller bearings 36 and 37 are provided which radially support the worm and thrust bearings 38 support the worm axially. The worm drive runs in an oil bath 39, which is fed by a known and, therefore, not described supply device.

An auxiliary worm gear 40 is fixedly secured to the workpiece spindle 5 or to the drive worm gear 35 below the worm gear 35. A worm 41 mates with the auxiliary worm gear 40. The pitch of the worm 41 lies slightly outside of the automatic locking area so that it can be driven by the auxiliary worm gear 40. The worm 41 is radially supported and axially supported by bearings 42 and 43 (FIG. 3). A brake cone 45 (FIG. 3) is secured to one end of a worm shaft 44 on which the worm 41 is mounted. The brake cone 45 slides axially in a correspondingly shaped cone sleeve 46. The cone sleeve 46 is supported axially longitudinally movably in the machine frame 6 or a part connected to it. The cone sleeve 46 is also secured against rotation by grooves and wedges 47 located at the end thereof remote from the cone-shaped recess. The cone sleeve 46 is pressed by a spring 48 against the brake cone 45. The force of the spring 48 can be controlled by means of an adjusting screw 49; with this the brake friction can be selected. To lubricate the brake cone 45 or the cone sleeve 46, oil is supplied at the connection 50 and is discharged at the connection 51. The tooth clearance (backlash) of the worm gearing is done away with the braking the worm 41. As above discussed, the worm pitch of the worm 41 lies only slightly outside of the self-locking range, namely it lies shortly therebefore. This prevents or at least minimizes the likelihood of a rebound from the workpiece spindle to the worm drive.

The machine is equipped with a hydraulically driven chucking device. The chucking function is accomplished by means of a back-and-forth moving element, as for example in the known collets and lever chucking devices or other known chucking devices. The subject matter of the invention is the drive therefor (See my copending application Ser. No. 762,752, filed on even date herewith). The said back-and-forth moving chucking element is, because known, not shown and described. A chucking piston 54 is precisely guided in a chucking cylinder 55. The chucking cylinder 55 is closed by an end plate 56 on the side which faces the face plate 4 and is secured to the fact plate 4. A connecting piece 57 which is connected to the piston 54 extends through an opening in the end plate 56. The connecting piece is connected to the chucking device, which, insofar as it concerns the chucking mechanism, is not illustrated. On the opposite side of the piston 54, a piston rod 58 extends downwardly through the bottom of the cylinder 55. The chucking piston 54 is secured against rotation in the chucking cylinder by one or several bolts 59.

The chucking piston 54 forms with the chucking cylinder two chambers 60 and 61 which can be supplied with a pressure medium, for example oil, for chucking and/or unchucking. The following device is used for this purpose. Two pipes 62, 63 are secured on the front side (lower side) of the piston rod 58, which pipes are each connected through channels 64, 65 to the said chambers 60 and 61. The pipes extend approximately to the lower end of the workpiece spindle 5 where they are secured to a connecting flange 66, for example by soldering. A connecting pin 67 is secured to the connecting flange 66 and extends downwardly therefrom. The connecting pin 67 is surrounded by a connecting sleeve 68 and extends downwardly inside thereof. The connecting sleeve 68 is supported on the connecting pin 67 by a spring ring 69 or the like secured to the connecting pin adjacent the lower end thereof. The connecting pin 67 and connecting sleeve 68 are slightly relatively rotatable with respect to one another, however, closely fitted into one another. As is described below, it is also possible to provide seals, which to a certain degree make the close fitting into one another unnecessary. The piston rod 58 and the connecting flange 66 are additionally connected to one another by a holding sleeve 70 so that the above-mentioned pipes 62, 63 and their connections are not subjected to axial loads. The connecting sleeve 68 is secured against rotation by a bar 70A (FIG. 3) or the like which engages an abutment on the spindle 5.

The connecting sleeve 68 has at the free front side lowermost surface two hose connectors, of which one is illustrated and has the reference numeral 71. Schematically illustrated hoses 114 are connected to said hose connectors, which hoses lead to the pressure medium supply plant 113. The storage reservoir, pump, excess pressure (relief) valve, filter, pipes and the like, since known, have not been shown. The one pipe connector 71 is connected through bores 72 and annular groove 73 in the connecting sleeve 68, bores 74 in the connecting pin 67, pipe 62, channel 64 to the chamber 61 below the chucking piston 54. The other, not shown, hose connector is connected through bores 75 and annular groove 76 in the connecting sleeve 68, bores 77 in the connecting pin 67, pipe 63, channel 65 to the chamber above the chucking piston 54. In order to catch leaking oil around the connecting pin 67, a further annular groove 78 is provided in the connecting sleeve and encircles the connecting pin 67. Seals 79 can be provided between the annular grooves.

It is preferable to provide an axial bearing 80 between the connecting sleeve 68 and connecting flange 66. If the workpiece is supposed to be chucked by lifting the connecting piece 57, then the chamber 61 is supplied with pressure medium and the chamber 60 is emptied. If chucking is done by lowering the connecting piece, then the chamber 60 is filled and the chamber 61 is emptied. To unchuck the chambers are supplied in reversed sense.

The pressure medium infeed and discharge is controlled depending on the position of the chucking piston. A tracer 80A is used for this purpose and taps or detects the axial movement of the connecting sleeve 68, comparable with the movement of the chucking piston 54. A connecting screw 81 secured to the sleeve 68 is provided for a play-free adjustment therebetween. The tracer 80A is clamped onto a shaft 82 (FIG. 3), which is supported in the machine frame 6. Two cams 83 and 84 are secured to the free end of the shaft 82. One of the cams 83 cooperates with two switches, of which one, 85, is shown. These two switches are operated by the cam when the chucking piston 54 reaches the upper and lower extreme positions. The switches then switch off the pressure medium inflow. These switches are substantially safety switches for the final positions of the chucking piston.

The cam 84 is adjustable and acts onto a third switch 86. The switch 86 controls the pressure medium plant 113 according to the real or actual chucking position of the chucking piston 54, thus adjustable somewhere in its area of movement. Thus, for example, either manually or automatically, the chucking operation is initiated by a not-shown further switch, which is operated for example in dependency from a loading device and is terminated by the said switch 86, in that, for example, the pressure medium supply and discharge to and from both chambers is blocked or the pressure in the chucking direction is maintained and only the discharge is blocked.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privelege is claimed are defined as follows:

1. In a drive mechanism for a spindle rotatably mounted on a tool machine having worm gearing with play compensation provided by a first worm, the improvement comprising wherein said spindle is connected to and driven by a second worm of said worm gearing, drive means on said spindle for driving said first worm, the helix angle of said first worm being outside of the automatic locking area, and a brake device coupled to said first worm for resisting rotation thereof to effect an application of a rotation resisting load on said spindle and a backlash fee connection of said spindle to said worm gearing.

2. The improved drive mechanism according to claim 1, wherein said spindle is adapted to support a workpiece and wherein said worm gearing includes an auxiliary and driven worm gear for driving said first worm.

3. The improved drive mechanism according to claim 1, wherein the helix angle of said first worm lies closely outside of said automatic locking area.

4. The improved drive mechanism according to claim 1, wherein said brake device is a friction brake.

5. The improved drive mechanism according to claim 4, wherein said friction brake has conical frictional surfaces.

6. The improved drive mechanism according to claim 4, wherein said brake device comprises a sleeve having a cone-shaped recess therein and a brake cone received in said cone-shaped recess and adjustable resilient means for urging said brake cone and said cone-shaped recess into engagement with each other.

7. The improved drive mechanism according to claim 2, wherein said spindle has a first worm gear fixedly mounted thereon and driven by said second worm; and
 wherein said auxiliary and driven worm gear is a second worm gear fixedly mounted thereon and driving said first worm in response to a rotation of said spindle.

* * * * *